United States Patent
Yoshida et al.

(10) Patent No.: US 8,623,131 B2
(45) Date of Patent: Jan. 7, 2014

(54) SURFACE TREATMENT AGENT AND SURFACE TREATMENT METHOD

(75) Inventors: Masaaki Yoshida, Kawasaki (JP); Mai Sugawara, Kawasaki (JP); Jun Koshiyama, Kawasaki (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 362 days.

(21) Appl. No.: 12/889,905

(22) Filed: Sep. 24, 2010

(65) Prior Publication Data

US 2011/0073011 A1 Mar. 31, 2011

(30) Foreign Application Priority Data

Sep. 28, 2009 (JP) .................................. 2009-222118
Nov. 13, 2009 (JP) .................................. 2009-260037

(51) Int. Cl.
 *C09D 5/00* (2006.01)
(52) U.S. Cl.
 USPC ...................................................... 106/287.11
(58) Field of Classification Search
 None
 See application file for complete search history.

(56) References Cited

U.S. PATENT DOCUMENTS 7,081,673 B2 * 7/2006 Hedrick et al. ............... 257/751
2004/0137153 A1 * 7/2004 Thomas et al. ............... 427/384

FOREIGN PATENT DOCUMENTS

| JP | H06-163391 A | 6/1994 |
| JP | H07-142349 A | 6/1995 |
| JP | H11-511900 | 10/1999 |
| WO | WO 96/15861 | 5/1996 |

* cited by examiner

*Primary Examiner* — Melvin C Mayes
*Assistant Examiner* — Stefanie Cohen
(74) *Attorney, Agent, or Firm* — Knobbe Martens Olson & Bear LLP

(57) ABSTRACT

Provided are a surface treatment agent that can effectively suppress pattern collapse of an inorganic pattern or resin pattern provided on a substrate, a surface treatment method using such a surface treatment agent, as well as a surface treatment agent that can carry out silylation treatment to a high degree on the surface of a substrate, and a surface treatment method using such a surface treatment agent. A surface treatment agent is used that is employed in hydrophobization treatment of a substrate surface and includes a silylation agent containing at least one compound having a disilazane structure and a solvent containing a five- or six-membered ring lactone compound.

4 Claims, No Drawings

US 8,623,131 B2

SURFACE TREATMENT AGENT AND SURFACE TREATMENT METHOD

This application is based on and claims the benefit of priority from Japanese Patent Application Nos. 2009-222118 and 2009-260037, respectively filed on 28 Sep. 2009 and 13 Nov. 2009, the contents of which are incorporated herein by reference.

BACKGROUND OF THE INVENTION

1. Field of the Invention

The present invention relates to a surface treatment agent and a surface treatment method, and particularly relates to a surface treatment agent used in hydrophobization treatment of a substrate surface used in semiconductor integrated-circuit production, and a surface treatment method using this.

2. Related Art

In the production of semiconductor devices and the like, a lithography technique is applied prior to conducting processing such as etching on a substrate. With this lithography technique, a photosensitive resin composition is used to provide a photosensitive resin layer on the substrate, then this is selectively irradiated and exposed by actinic radiation, and after a developing process has been performed, the photosensitive resin layer is selectively dissolved and removed to form a resin pattern on the substrate.

Incidentally, in recent years, trends in higher integration and miniaturization of semiconductor devices have grown, and thus progress towards miniaturization and higher aspect ratios of the inorganic pattern manufactured using a resin pattern as a mask and etching processes has advanced. However, a problem has arisen of so-called pattern collapse in the meantime. This pattern collapse is a phenomenon when forming several resin patterns and inorganic patterns on a substrate in parallel, in which adjacent patterns close in so as to lean on one another, and depending on the situation, the pattern become damaged and separate from the base. If such pattern collapse occurs, the desired product will not be obtained, thereby causing a decline in the yield and reliability of the product.

This pattern collapse is known to occur when drying a cleaning liquid in a cleaning process after pattern formation, due to the surface tension of this cleaning liquid. In fact, when the cleaning liquid is removed in a drying step, stress based on the surface tension of the cleaning liquid acts between patterns, whereby pattern collapse occurs.

Consequently, there have been numerous experiments thus far to prevent pattern collapse by adding a substance to the cleaning liquid that causes the surface tension to decrease. For example, a cleaning liquid to which isopropyl alcohol, a cleaning liquid to which a fluorine-based surfactant, and the like have been proposed (for example, refer to Patent Documents 1 and 2).

In addition, although not the same as pattern collapse, in order to improve adhesion between the resin pattern, which is the mask, and the surface of the substrate to prevent a partial loss of the resin pattern by a chemical developing solution, hydrophobization treatment (silylation treatment) has been performed on the surface of substrates using hexamethyldisilazane (HMDS) (for example, refer to "Background of the Invention" of Patent Document 3).

PRIOR ART DOCUMENTS

Patent Documents

Patent Document 1: Japanese Unexamined Patent Application Publication No. H6-163391
Patent Document 2: Japanese Unexamined Patent Application Publication No. H7-142349
Patent Document 3: Japanese Unexamined Patent Application Publication No. H11-511900

SUMMARY OF THE INVENTION

However, with the cleaning liquid schemes described in Patent Documents 1 and 2, there has been a problem in that prevention of pattern collapse is insufficient. In addition, in a case of conducting silylation treatment on the surface of a substrate using HMDS, time may be required in the silylation treatment and the desired effects may not be obtained due to the silylation treatment of the surface of the substrate not being sufficient.

The present invention was made taking into account the above situation, and has an object of providing a surface treatment agent that can effectively suppress pattern collapse of an inorganic pattern or resin pattern provided on a substrate, and a surface treatment method using such a surface treatment agent. In addition, as another object, the present invention has an object of providing a surface treatment agent that can carry out silylation treatment to a high degree, and a surface treatment method using such a surface treatment agent.

MEANS FOR SOLVING THE PROBLEMS

In order to solve the abovementioned problems, the present inventors have conducted extensive studies. As a result thereof, they have found that, when using a surface treatment agent in which a silylation agent having a disilazane structure and a specific solvent are combined, the surface of the substrate is highly silylated (hydrophobized), thereby arriving at completion of the present invention.

According to a first aspect of the present invention, a surface treatment agent used in hydrophobization treatment of a substrate surface includes a silylation agent containing at least one compound having a disilazane structure and a solvent containing a five- or six-membered ring lactone compound.

According to a second aspect of the present invention, a surface treatment method includes exposing a surface of a substrate to the surface treatment agent according to the first aspect of the present invention, and treating the surface of the substrate.

EFFECTS OF THE INVENTION

According to the present invention, provided are a surface treatment agent that can effectively suppress pattern collapse of an inorganic pattern or resin pattern provided on a substrate, and a surface treatment method using such a surface treatment agent. In addition, according to the present invention, provided are a surface treatment agent that can carry out silylation treatment to a high degree on the surface of a substrate, and a surface treatment method using such a surface treatment agent.

DETAILED DESCRIPTION OF THE INVENTION

Surface Treatment Agent

First, a surface treatment agent of the present invention will be explained. The surface treatment agent of the present invention is ideally used when carrying out hydrophobization treatment on a surface of a substrate by silylating. Herein, a substrate used for semiconductor devise manufacturing is exemplified as the "substrate", which is the target of silylation treatment, the "surface of the substrate" is exemplified by the surface of the substrate itself, as well as the surfaces of the inorganic pattern and resin pattern provided on the substrate, and the surfaces of the inorganic layer and organic layer that have not been patterned.

As the inorganic pattern provided on the substrate, a pattern is exemplified that has been formed by producing an etching mask on the surface of an inorganic layer present on the substrate by way of a photoresist method, and subsequently performing an etching process. Other than the substrate itself, an oxide film of an element constituting the substrate, a film of an inorganic matter formed on the surface of the substrate, or the like are exemplified as the inorganic layer.

As the resin pattern provided on the substrate, a resin pattern formed on the substrate by a photoresist method is exemplified. Such a resin pattern, for example, is formed by forming an organic layer, which is a film of photoresist, on the substrate, exposing this organic layer through a photomask, and developing. Other than on the surface of the substrate itself, such an organic layer is provided on the surface of a laminated film provided on the surface of the substrate or the like.

Since the surface treatment agent of the present invention is vaporized by a means such as heating and bubbling, the vaporized surface treatment agent may be used to perform surface treatment by being made to contact the surface of a substrate, and may be used, for example, to perform surface treatment by coating the surface of the substrate in liquid form by a means such as a spin-coating method or dipping method, for example.

The surface treatment agent of the present invention at least contains a silylation agent and a solvent. Each component thereof will be explained hereinafter.

Silylation Agent

First, a silylation agent used in the surface treatment agent of the present invention will be explained. The silylation agent used in the surface treatment agent of the present invention is a component for increasing the hydrophobicity of the surface of a substrate, and includes at least one compound having a disilazane structure.

A compound having a disilazane structure indicates a compound having the structure shown by the following general formula (1). Although not particularly limited, a compound expressed by the following general formula (2) is exemplified as such a compound.

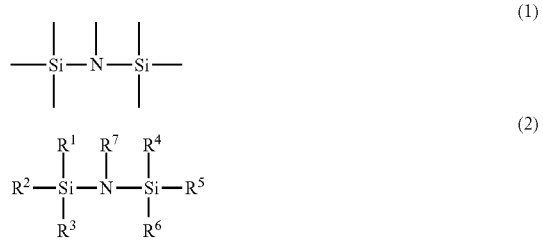

In the above general formula (2), $R^1$ to $R^6$ each independently represent a hydrogen atom, halogen atom or organic group, and $R^7$ represents a hydrogen atom, alkyl group, trimethylsilyl group or dimethlysilyl group. In addition, $R^3$ and $R^6$ may be divalent organic groups bonded together.

As the compound (silylation agent) represented by the above general formula (2), a disilazane compound such as hexamethyldisilazane, hexaethyldisilazane, N-methyl-hexamethyldisilazane, 1,1,3,3-tetramethyldisilazane, 1,3-dimethyldisilazane, 1,2-di-N-octyltetramethyldisilazane, 1,3-divinyltetramethyldisilazane, heptamethyldisilazane, nonamethyltrisilazane, tris(dimethylsilyl)amino, tris(trimethylsilyl)amino, pentamethylethyldisilazane, pentamethylvinyldisilazane, pentamethylpropyldisilazane, pentamethylphenylethyldisilazane, pentamethyl-tert-butyldisilazane, pentamethylphenyldisilazane, and trimethyltriethyldisilazane; and cyclic polysilazane compounds such as 2,2,5,5-tetramethyl-2,5-disila-1-azacyclopentane, 2,2,4,4,6,6-hexamethylcyclotrisilazane, 2,4,6-trimethyl-2,4,6-trivinylcyclotrisilazane, octamethylcyclotetrasilazane, and 2,2,6,6-tetramethyl-2,6-disila-1-azacyclohexane; and the like are exemplified. Among these, it is preferable to use hexamethyldisilazane, hexaethyldisilzane, and 2,2,5,5-tetramethyl-2,5-disila-1-azacyclopentane. These silylation agents can be used individually or by combining at least 2 thereof.

The reason that the surface treatment agent of the present invention contains a silylation agent having a disilazane structure is that the present inventors learned that the silylation performance under the presence of the specific solvent described later would be dramatically increased when a compound having a disilazane structure is used as the silylation agent. Although the reason thereof is not necessary clear, the present inventor performed analysis, and as a result found that a silanamine derivative was generated with the surface treatment agent containing a compound having a disilazane structure and the specific solvent described later, and thus it was assumed that this silanamine derivative became an active species and caused the silylation reaction to be promoted.

It should be noted that the silylation agent used in the present invention has a disilazane structure; therefore, at least two silicon atoms are contained in the compound. It is possible for any kind of substituent to bond to this silicon atom. Herein, in a case of an aryl group being contained as a substituent bonding to this silicon atom, the reactivity of the silylation agent will increase greatly due to the predetermined solvent of the present invention described later, and there is also a possibility for the silylation agent to react with the small amount of water contained in the solvent and deactivate during storage of the surface treatment agent. From such a point of view, in a case of using a compound having an aryl group as a substituent bonding to the silicon atom as the silylation agent, it is preferable to use a solvent on which a dewatering process has been conducted as the solvent described later. In addition, in a case of using a normal solvent on which a dewatering process has not been carried out as the solvent described later, it is preferable to use a compound in which only one among the substituents bonded to silicon atoms is an aryl group, or a compound that does not contain an aryl group as a substituent bonded to a silicon atom, as the silylation agent.

Solvent

Next, the solvent used in the surface treatment agent of the present invention will be explained. The solvent used in the surface treatment agent of the present invention is a component used by mixing with the above-mentioned silylation agent, and is a five- or six-membered ring lactone compound. Above all, it is preferably at least one selected from the group consisting of γ-butyolactone, γ-valerolactone, δ-valerolactone, δ-hexanolactone and γ-hexanolactone. These solvents can be used individually or by combining at least two thereof.

By containing the above-mentioned solvent component, the surface treatment agent of the present invention has a silylation performance (i.e. hydrophobization performance)

related to the surface of a substrate that is remarkably improved compared to a case of solely the above-mentioned silylation agent. As already mentioned, the present invention was completed by finding that the degree of hydrophobization (degree of increasing the contact angle of water on the surface of the substrate) for the surface of the substrate was dramatically improved by combining a silylation agent having a disilazane structure and the above listed specific solvent compound, and the anticipated effects are not obtained even by adding a compound other than the above listed solvents. Among the above listed solvent components, it is particularly preferable to use γ-butyrolactone from the aspect of ease of procurement in industry.

Herein, solvent generally indicates a compound that can dissolve the above-mentioned silylation agent; however, in the present invention, a five- or six-membered ring lactone compound shown above is called the "solvent" component in particular, and other compounds that can dissolve the above-mentioned silylation agent are called "other solvent" component. It should be noted that the anticipated effects are not obtained even by adding "other solvent" components without adding the "solvent" component to the above-mentioned silylation agent, and only an effect of a certain level equal to a case of solely using the above-mentioned silylation agent or less is obtained.

The amount used of the above-mentioned solvent is not particularly limited, and the content of the silylation agent is preferably an amount no more than 10% by mass relative to the total content of the silylation agent and the solvent, or the content of the solvent is preferably an amount no more than 10% by mass relative to the total content of the silylation agent and the solvent. The surface treatment agent of the present invention contains the above-mentioned silylation agent and solvent; however, for this case, a case in which the silylation agent is an abundant component thereof, and a case in which the solvent is an abundant component thereof are considered. "The content of the silylation agent being no more than 10% by mass relative to the total content of the silylation agent and the solvent, or the content of the solvent being no more than 10% by mass relative to the total content of the silylation agent and the solvent" means that, even if either of the silylation agent or the solvent were to become an abundant component, the content of the component among these that is a minor component would be no more than 10% by mass relative to the total content of the silylation agent and the solvent. In other words, the amount of solvent contained in the surface treatment agent of the present invention is preferably no more than 10% by mass or at least 90% by mass relative to the total content of the silylation agent and the solvent.

By the content of the silylation agent or the solvent being no more than 10% by mass relative to the total content of the silylation agent and the solvent, the silylation agent and the solvent separating in the surface treatment agent and forming two layers is suppressed. In a case of the surface treatment agent of the present invention containing more solvent than silylation agent (i.e. in a case of the silylation agent being a minor component), the content of the silylation agent relative to the total content of the silylation agent and solvent is more preferably 0.1 to 7% by mass, and most preferably 1 to 5% by mass. In addition, in a case of the surface treatment agent of the present invention containing more silylation agent than solvent (i.e. in a case of the solvent being the minor component), the content of the solvent relative to the total content of the silylation agent and solvent is more preferably 0.1 to 10% by mass, and most preferably 1 to 5% by mass.

It should be noted that the above-mentioned preferred ranges are based on the viewpoint of the mixing properties of the silylation agent and solvent, and the miscibility may be sufficient for a combination of the silylation agent and the solvent even if the above-mentioned ranges are exceeded. In addition, even if the miscibility is not sufficient, it may not interfere with the effects of the present invention being exerted. In such a case, the silylation agent and solvent can be mixed and used in arbitrary ratios irrespective of the above-mentioned description.

Other Solvents

The surface treatment agent of the present invention may contain other solvent component in addition to the above-mentioned solvent component. By the surface treatment agent of the present invention containing other solvent component, it is possible to improve the coating workability on the surface of a substrate, handling ability, etc. So long as being able to dissolve the above-mentioned silylation agent and the above-mentioned solvent component and causing little damage to the surface of the substrate (inorganic pattern, resin pattern, etc.), a convention well-known solvent can be used as the solvent without being particularly limited.

More specifically, sulfoxides such as dimethylsulfoxide; sulfones such as dimethylsulfone, diethylsulfone, bis(2-hydroxyethyl)sulfone and tetramethylenesulfone; amides such as N,N-dimethylformamide, N-methylformamide, N,N-dimethylacetamide, N-methylacetamide and N,N-dimethylacetamide; lactams such as N-methyl-2-pyrrolidone, N-ethyl-2-pyrrolidone, N-propyl-2-pyrrolidone, N-hydroxymethyl-2-pyrrolidone and N-hydroxyethyl-2-pyrrolidone; imidazolidinones such as 1,3-dimethyl-2-imidazolidinone, 1,3-diethyl-2-imidazolidinone and 1,3-diisopropyl-2-imidazolidinone; dialkyl glycol ethers such as dimethyl glycol, dimethyl diglycol, dimethyl trigylcol, methylethyl diglycol and diethyl glycol; (poly)alkylene glycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate and propylene glycol monoethyl ether acetate; other ethers such as diethylene glycol dimethyl ether, diethylene glycol methylethyl ether, diethylene glycol diethyl ether and tetrahydrofuran; ketones such as methyl ethyl ketone, cyclohexanone, 2-heptanone and 3-heptanone; alkyl lactate esters such as 2-hydroxypropanoic acid methyl and 2-hydroxypropanoic acid ethyl; other esters such as 2-hydroxy-2-methylpropanoic acid ethyl, 3-methoxypropanoic acid methyl, 3-methoxypropanoic acid ethyl, 3-ethoxypropanoic acid methyl, 3-ethoxypropanoic acid ethyl, ethoxyacetic acid ethyl, hydroxyacetic acid ethyl, 2-hydroxy-3-methylbutanoic acid methyl, 3-methyl-3-methoxybutyl acetate, 3-methyl-3-methoxybutyl propionate, ethyl acetate, n-propyl acetate, i-propyl acetate, n-butyl acetate, i-butyl acetate, n-pentyl formate, i-pentyl acetate, n-butyl propionate, ethyl butyrate, n-propyl butyrate, i-propyl butyrate, n-butyl butyrate, methyl pyruvate, ethyl pyruvate, n-propyl pyruvate, methyl acetoacetate, ethyl acetoacetate and ethyl 2-oxobutanoate; lactones such as β-propiolactone, γ-butyrolactone and δ-pentyrolactone; terpenes such as p-menthane, diphenyl methane, limonene, terpinene, bornane, norbornane and pinane; and the like can be exemplified. These solvents can be used individually or by mixing at least two thereof.

Surface Treatment Method

Next, a surface treatment method of the present invention will be explained.

The surface treatment method of the present invention exposes the surface of a substrate to the above-mentioned surface treatment agent of the present invention, and treats the surface of this substrate.

As has been explained, the surface of the substrate, which is the treatment target of the surface treatment method of the present invention, includes the surface of the substrate itself, the surface of an inorganic pattern and resin pattern and an inorganic layer and organic layer that is not patterned, provided on the substrate. Since explanations for the surface of the inorganic pattern and resin pattern and the inorganic layer and organic layer, which are not patterned, provided on the substrate are as mentioned earlier, the explanations are omitted here.

The surface treatment method of the present invention performs hydrophobization treatment by silylating the surface of a substrate, and the object of this treatment may be anything; however, as a representative example of the object of this treatment, (1) to improve the adhesion to a resin pattern composed of photoresist or the like, and (2) to prevent pattern collapse of an inorganic pattern or resin pattern on the surface of a substrate during cleaning of the surface of the substrate can be given.

In the case of having the above-mentioned (1) as an object, prior to a step of forming an organic layer, which is a film of photoresist, on the surface of a substrate, for example, the surface of the substrate may be exposed to the above-mentioned surface treatment agent of the present invention. As a method of exposing the surface of the substrate to the above-mentioned surface treatment agent of the present invention, a convention well-known method can be used without being particularly limited. For example, a method of vaporizing the above-mentioned surface treatment agent of the present invention to form vapor and causing this vapor to contact the surface of the substrate, a method of causing the above-mentioned surface treatment agent of the present invention to contact the surface of the substrate by a spin-coating method, immersion method, etc. can be exemplified. By such an operation, the surface of the substrate is silylated, and the hydrophobicity of the surface of the substrate is improved; therefore, the adhesion to an organic layer such as the photoresist or the like is improved, for example.

In the case of having the above-mentioned (2) as an object, prior to performing a cleaning operation after an inorganic pattern or resin pattern has been formed, the surface of the substrate may be exposed to the above-mentioned surface treatment agent of the present invention. Next, the reason that pattern collapse of an inorganic pattern or resin pattern on the surface of a substrate can be prevented during cleaning of the surface of the substrate by conducting such a surface treatment will be explained.

Usually, after an inorganic pattern has been formed on the surface of a substrate, the surface of the pattern is generally cleaned using a cleaning liquid such as SPM (sulfuric acid/hydrogen peroxide solution) and APM (ammonia/hydrogen peroxide solution). In addition, after a resin pattern has been formed on the surface of a substrate, developing residue and adhered developing solution are generally cleaned and removed using a cleaning liquid such as water and a surfactant containing cleaning liquid.

In the surface treatment method of the present invention, prior to cleaning such an inorganic pattern or resin pattern, the pattern surface is treated with the above-mentioned surface treatment agent, and the surface of the pattern is hydrophobized.

Herein, the force F acting between the patterns of the inorganic pattern and resin pattern during cleaning is represented as in the following formula (1). In the formula, γ represents the surface tension of the cleaning liquid, θ presents the contact angle of the cleaning liquid, A represents the aspect ratio of the pattern, and D represents the distance between the pattern side walls.

$$F = 2\gamma \cdot \cos\theta \cdot A/D \qquad (I)$$

Therefore, if the surface of the pattern can be hydrophobized and the contact angle of the cleaning liquid increased (cos θ reduced), the force acting between the patterns during the following cleaning can be reduced, and thus pattern collapse can be prevented.

This surface treatment is performed by immersing the substrate on which an inorganic pattern or resin pattern has been formed in the surface treatment agent, or by coating or spraying the surface treatment agent on the inorganic pattern or resin pattern. The treatment time is preferably 1 to 60 seconds. In addition, after this surface treatment, the contact angle of water on the pattern surface preferably becomes 60 to 120 degrees, and more preferably becomes 75 to 100 degrees.

When the above surface treatment has finished, the inorganic pattern or resin pattern is cleaned. In this cleaning process, cleaning liquids that have been conventionally used in cleaning processes of inorganic patterns and resin patterns can be applied without modification in this cleaning process. For example, SPM, APM, and the like can be exemplified for the inorganic pattern, and water, surfactant containing cleaning liquid, and the like can be exemplified for the resin pattern.

It should be noted that the surface treatment and cleaning process are preferably continuous processes from the viewpoint of throughput. As a result, it is preferable to select a liquid that excels in displaceability with the cleaning liquid as the surface treatment agent. In this respect, in a case of using a water-based liquid as described above as the cleaning liquid, it is preferable that the solvent is the abundant component, among the silylation agent and the solvent contained in the surface treatment agent. This is because the displaceability of the surface treatment agent with a water-based cleaning liquid is improved by making the solvent the abundant component, since the solvent of the present invention is water soluble. From such a viewpoint, the content of the silylation agent relative to the total content of the silylation agent and the solvent is preferably no more than 10% by mass, more preferably 0.1 to 7% by mass, and most preferably 1 to 5% by mass.

EXAMPLES

Although the present invention will be explained more specifically by way of Examples hereinafter, the present invention is not to be limited to the following Examples.

Preparation of Surface Treatment Agent 1

Examples 1 to 7

As shown in Table 1, the surface treatment agents of Examples 1 to 7 were prepared using hexamethyldisilazane (HMDS) or 1,3-divinyltetramethyldisilazane (DVTMDS) as the silylation agent, by diluting this to a concentration shown in Table 1 with γ-butyrolactone or γ-valerolactone, which are solvent components.

Comparative Examples 1 to 12

The mixture with HMDS or DVTMD, which is the silylation agent, was set as the surface treatment agent of Comparative Example 1 or 2. In addition, as shown in Table 1, the surface treatment agents of Comparative Examples 3 to 12 were prepared using HMDS as the silylation agent by diluting this to a concentration shown in Table 1 with ethyl lactate (EL), n-heptane, 4-methyl-2-pentanol(methyl isobutyl carbinol (MIBC)), propylene glycol monomethyl ether acetate (PGMEA), propylene glycol monomethyl ether (PGME), propylene glycol dimethyl ether (MMPOM), propylene glycol monopropyl ether (PGP), diisoamyl ether (DIAE), cyclohexanone or diethyl diglycol (DEDG), which are other solvent components.

Comparative Examples 13 and 14

N,N-diethylaminotrimethylsilane (DEATMS) itself, which is a silylation agent not having a disilazane structure, was set as the surface treatment agent of Comparative Example 13. In addition, as shown in Table 1, the surface treatment agent of Comparative Example 14 was prepared using DEATMS as the silylation agent, by diluting this to a concentration shown in Table 1 with γ-butyrolactone, which is a solvent component.

Example 8

The surface treatment agent of Example 8 was prepared using 2,2,5,5-tetramethyl-2,5-disila-1-azacyclopentane (DSACP), which is a silylation agent having a cyclic disilazane structure, by diluting this to a concentration shown in Table 1 with γ-butyrolactone, which is a solvent component.

Comparative Example 15

DSACP itself, which is a silylation agent having a cyclic disilazane structure, was set as the surface treatment agent of Comparative Example 15.

Confirmation of Hydrophobization Effect 1

For each of the surface treatment agents of Examples 1 to 8 and Comparative Examples 1 to 15, after a silicon wafer had been immersed for 30 seconds at room temperature, the surface of this silicon wafer was cleaned with methyl ethyl ketone, and was made to dry by flowing nitrogen. Then, using a Dropmaster 700 (Kyowa Interface Science Co., Ltd.), a droplet of pure water (1.8 μL) was dropped on the surface of this silicon wafer, and the contact angle was measured 10 seconds after dropping. The results thereof are shown in Table 1. It should be noted that the contact angle listed in Table 1 as "comparison" is a numerical value of a contact angle on a silicon wafer surface to which the surface treatment with the surface treatment agent had not been conducted.

TABLE 1

| | Silylation agent | Solvent component or other solvent component | Silylation agent concentration (percent by mass) | Contact angle (degrees) |
|---|---|---|---|---|
| Example 1 | HMDS | γ-butyrolactone | 1.0 | 84.8 |
| Example 2 | HMDS | γ-butyrolactone | 5.0 | 88.0 |
| Example 3 | HMDS | γ-butyrolactone | 95.0 | 89.8 |
| Example 4 | HMDS | γ-butyrolactone | 99.0 | 84.8 |
| Example 5 | HMDS | γ-butyrolactone | 99.9 | 89.8 |
| Example 6 | HMDS | γ-valerolactone | 95.0 | 79.4 |
| Example 7 | DVTMDS | γ-butyrolactone | 95.0 | 90.5 |
| Example 8 | DSACP | γ-butyrolactone | 3.0 | 92.4 |
| Comparative Example 1 | HMDS | — | 100 | 52.9 |
| Comparative Example 2 | DVTMDS | — | 100 | 43.0 |
| Comparative Example 3 | HMDS | EL | 1.0 | 21.1 |
| Comparative Example 4 | HMDS | n-heptane | 1.0 | 47.5 |
| Comparative Example 5 | HMDS | MIBC | 1.0 | 28.1 |
| Comparative Example 6 | HMDS | PGMEA | 1.0 | 25.7 |
| Comparative Example 7 | HMDS | PGME | 1.0 | 24.3 |
| Comparative Example 8 | HMDS | MMPOM | 1.0 | 23.0 |
| Comparative Example 9 | HMDS | PGP | 1.0 | 26.7 |
| Comparative Example 10 | HMDS | DIAE | 1.0 | 29.7 |
| Comparative Example 11 | HMDS | Cyclohexanone | 1.0 | 33.4 |
| Comparative Example 12 | HMDS | DEDG | 1.0 | 25.5 |
| Comparative Example 13 | DEATMS | — | 100 | 69.5 |
| Comparative Example 14 | DEATMS | γ-butyrolactone | 5.0 | 72.6 |
| Comparative Example 15 | DSACP | — | 100 | 76.0 |
| Comparison | — | — | — | 22.0 |

As shown in Table 1, with the surface treatment agents of Examples 1 to 7 using HMDS or DVTMDS, which are silylation agents having a disilazane structure, and γ-butyrolactone or γ-valerolactone, which are solvent components, it was confirmed that the contact angle was larger than for the surface treatment agent of Comparative Example 1 or 2 independently using a silylation agent (HMDS or DVTMDS), and the effects of the present invention were displayed. Since such effects were not confirmed with Comparative Examples 3 to 12 in which HMDS, which is a silylation agent having a disilazane structure, and other solvent component were combined, the effectiveness of combining a silylation agent having a disilazane structure with a specific solvent component used by the present invention was confirmed. In addition, when comparing Example 8 and Comparative Example 15, it is understood that there is a similar trend also in a case of using DSACP, which is a silylation agent having a cyclic disilazane structure.

Moreover, when comparing Comparative Example 13 and Comparative Example 14, it is understood that the effect increasing the contact angle drastically decreases in a case of setting DEATMS (a silylation agent not having a disilazane structure) as the silylation agent, even if using γ-butyrolactone as the solvent component. Also from this fact, the effectiveness of combining a silylation agent having a disilazane structure and the specific solvent component used in the present invention was confirmed.

Preparation of Surface Treatment Agent 2

Example 9

As shown in Table 2, the surface treatment agent of Example 9 was prepared using DSACP as the silylation agent, by diluting this to a concentration shown in Table 2 with γ-butyrolactone, which is a solvent component.

Comparative Examples 16 to 18

DSACP itself, which is a silylation agent, was set as the surface treatment agent of Comparative Example 16.

In addition, as shown in Table 2, the surface treatment agents of Comparative Examples 17 and 18 were prepared using DSACP as the silylation agent, by diluting this to a concentration shown in Table 2 with cyclohexane or PGMEA, which are other solvent components.

TABLE 2

| | Silylation agent | Solvent component or other solvent component | Silylation agent concentration (percent by mass) |
|---|---|---|---|
| Example 9 | DSACP | γ-butyrolactone | 3.0 |
| Comparative Example 16 | DSACP | — | 100 |
| Comparative Example 17 | DSACP | Cyclohexanone | 3.0 |
| Comparative Example 18 | DSACP | PGMEA | 3.0 |

Confirmation of Hydrophobization Effects 2

After having cleaned a silicon nitride (SiN) wafer for 3 minutes with a 0.1% hydrogen fluoride aqueous solution, the cleaned wafer was immersed for 30 seconds at room temperature using any of the surface treatment agents of Example 9 and Comparative Examples 16 to 18. The surface of each wafer that had been immersed in a surface treatment agent was made to dry by flowing nitrogen after cleaning with a cleaning liquid listed in Table 3, or without cleaning. For the dried wafers, a droplet of pure water (1.8 μL) was dropped on the surface of this silicon wafer, and the contact angle was measured 10 seconds after dropping, using a Dropmaster 700 (Kyowa Interface Science Co., Ltd.). The results thereof are shown in Table 3. It should be noted that, for "cleaning liquid after immersion treatment" in Table 3, "MEK" indicates having been cleaned with methyl ethyl ketone after immersion treatment, "IPA+DIW" indicates having been cleaned with isopropanol and ion-exchanged water after immersion treatment, "DIW" indicates having been cleaned with ion-exchanged water after immersion treatment, and "none" indicates not having performed cleaning after immersion treatment. In addition, for "standing period" in Table 3, "none" indicates that confirmation of the hydrophobization effect was performed within one day after preparation of the surface treatment agent, and "3 days" indicates that confirmation of the hydrophobization effect was performed after having been left to stand for three days at room temperature after preparation of the surface treatment agent.

TABLE 3

| | Surface treatment agent used | Silylation agent/solvent component or other solvent component | Treated base material (wafer) | Cleaning liquid after immersion treatment | Standing time | Contact angle (degrees) |
|---|---|---|---|---|---|---|
| Experimental Example 1 | Example 9 | DSACP (3 wt %)/γ-butyrolactone | SiN | None | None | 91 |
| Experimental Example 2 | Example 9 | DSACP (3 wt %)/γ-butyrolactone | SiN | None | 3 days | 88 |
| Experimental Example 3 | Example 9 | DSACP (3 wt %)/γ-butyrolactone | SiN | MEK | None | 88 |
| Experimental Example 4 | Example 9 | DSACP (3 wt %)/γ-butyrolactone | SiN | IPA + DIW | None | 88 |
| Experimental Example 5 | Example 9 | DSACP (3 wt %)/γ-butyrolactone | SiN | DIW | None | 89 |
| Comparative Experimental Example 1 | Comparative Example 16 | DSACP (100 wt %)/None | SiN | MEK | None | 58 |
| Comparative Experimental Example 2 | Comparative Example 17 | DSACP (3 wt %)/Cyclohexanone | SiN | None | None | 56 |
| Comparative Experimental Example 3 | Comparative Example 18 | DSACP (3 wt %)/PGMEA | SiN | None | None | 64 |

When comparing Experimental Example 1 with Comparative Experimental Examples 1 to 3, it is understood that the effect increasing the contact angle of a SiN wafer increased when using γ-butyrolactone as the solvent, in a case of setting DSACP having a cyclic disilazane structure as the silylation agent. Furthermore, such an effect was observed also in the case of the surface treatment agent having been left to stand for three days after preparation (Experimental Example 2). In addition, from such an effect having been observed also in a case of cleaning with various cleaning liquids after immersion treatment (Experimental Examples 3 to 5), it is understood that the hydrophobicity imparting group is strongly bonded to the surface of the wafer by covalent bonding.

From the above facts, the effectiveness of combining a silylation agent having a disilazane structure with the specific solvent component used in the present invention was confirmed also for a SiN substrate.

What is claimed is:

1. A surface treatment agent used in hydrophobization treatment of a substrate surface, consisting essentially of a silylation agent containing at least one compound having a disilazane structure and a solvent containing at least one five- or six-membered ring lactone compound selected from the group consisting of γ-butyrolactone, γ-valerolactone, δ-valerolactone, γ-hexanolactone and δ-hexanolactone, wherein the content of the silylation agent is no more than 10% by mass relative to total content of the silylation agent and the solvent, or the content of the solvent is no more than 10% by mass relative to the total content of the silylation agent and the solvent.

2. The surface treatment agent according to claim 1, wherein the five- or six-membered ring lactone compound is γ-butyrolactone.

3. The surface treatment agent according to claim 1, comprising hexamethyldisilazane, hexaethyldisilazane, or 2,2,5,5-tetramethyl-2,5-disila-1-azacyclopentane as the silylation agent.

4. A surface treatment method, comprising:
    exposing a surface of a substrate to a surface treatment agent according to claim 1 to treat the surface of the substrate.

* * * * *